Aug. 30, 1955  O. I. STEIGERWALT  2,716,268

METHOD OF MAKING PRINTED CIRCUITS

Filed Oct. 16, 1952  2 Sheets-Sheet 1

Inventor
Oliver I. Steigerwalt
By
Ralph Hammar
Attorney

Aug. 30, 1955   O. I. STEIGERWALT   2,716,268
METHOD OF MAKING PRINTED CIRCUITS
Filed Oct. 16, 1952   2 Sheets-Sheet 2

Inventor
Oliver I Steigerwalt
By Ralph Hammar
Attorney

United States Patent Office 2,716,268
Patented Aug. 30, 1955

2,716,268

METHOD OF MAKING PRINTED CIRCUITS

Oliver I. Steigerwalt, Erie, Pa., assignor to Erie Resistor Corporation, Erie, Pa., a corporation of Pennsylvania Application October 16, 1952, Serial No. 315,050

5 Claims. (Cl. 29—155.5)

This invention relates to the method and apparatus for producing printed electric circuits by embossing foil into a plastic sheet and surface grinding or abrading or cutting away the foil coated surface to a depth below the parts which are not embossed. The plastic sheet preferably contains fibers coated or impregnated with plastic. The sheet initially is felt-like and is finally compressed or set to a rigid incompressible state after the initial embossing of the foil into the sheet. The dies for embossing can be made by etching away the parts opposite the sections of foil which are not to be embossed. The foil may be pre-coated with adhesive or a film of adhesive may be placed between the foil and sheet to increase the adherence of the foil or the plastic may be the adhesive. The embossing is preferably carried out in a heated press at the start of the molding so that the embossing pressure may be that required to obtain clear definition of the embossed sections and is not limited by the required molding pressure. This initial embossing pressure does not interfere with the molding because of the time required to bring the plastic up to molding temperature. The foil is preferably copper having an etched surface adjacent the sheet and the other surface tinned or pre-coated with solder, e. g. 60 tin–40 lead.

Figure 1:
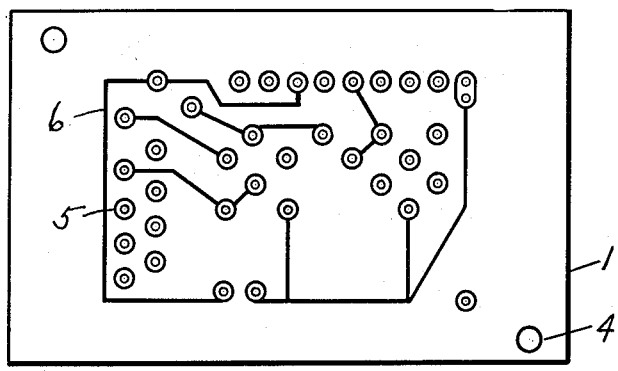
Figure 2:
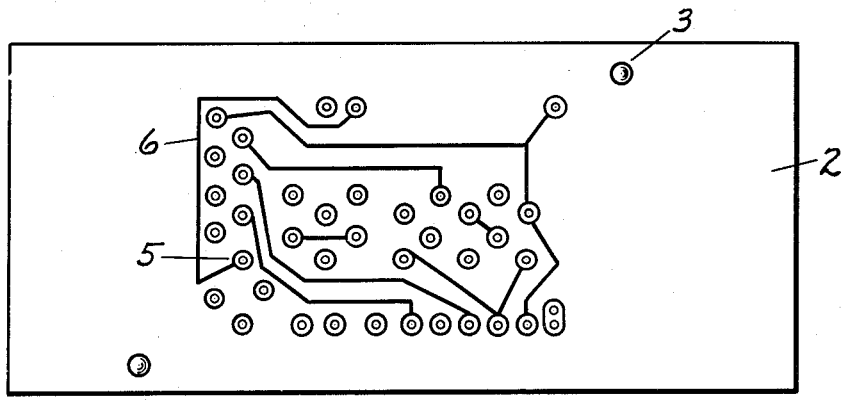
Figure 3:
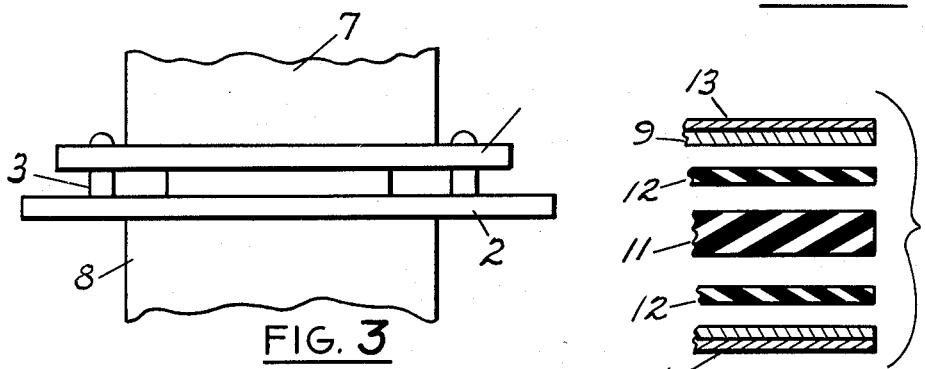
Figure 4:
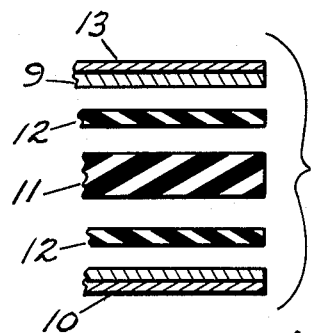
Figure 5:
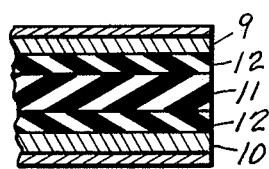
Figure 6:
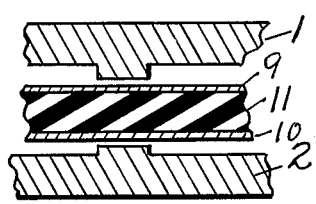
Figure 7:
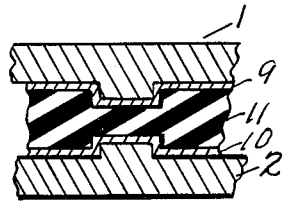
Figure 8:
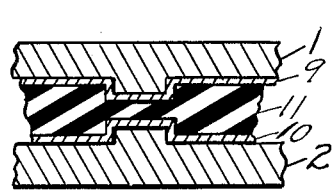
Figure 9:
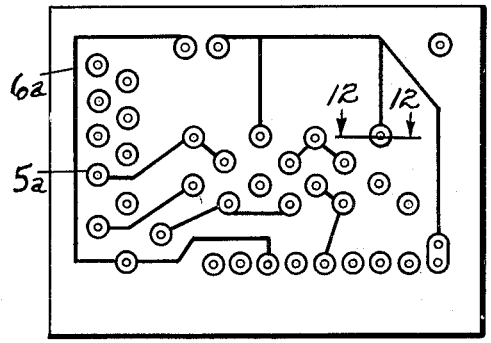
Figure 10:
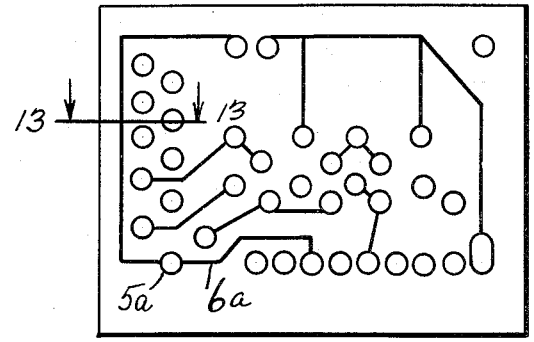
Figure 11:
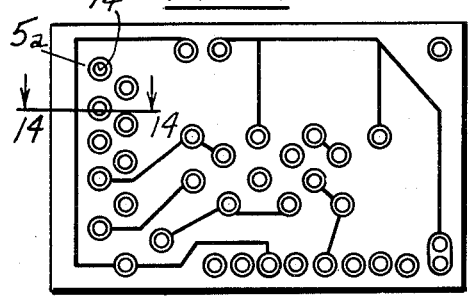
Figure 12:
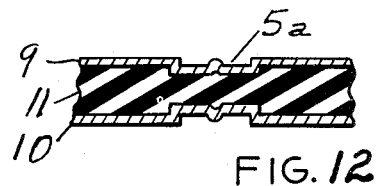
Figure 13:
Figure 14:
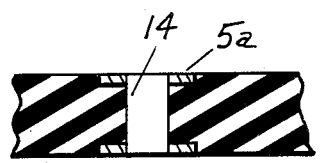

In the drawings, Figs. 1 and 2 are plan views of the embossing dies; Fig. 3 is a side view of the embossing dies in position in a press; Fig. 4 is an exploded view of the base sheet for supporting the electric circuit with the foil and adhesive layers separated therefrom; Fig. 5 is a fragmentary section through the completed electric circuit; Figs. 6, 7 and 8 are fragmentary views showing the successive stages of the embossing and curing operations; Fig. 9 is a plan view of one side of the electric circuit element as it comes from the press; Fig. 10 is a similar view after the parts of the foil which have not been embossed have been ground away; Fig. 11 is a similar view after the terminal portions of the circuit have been punched so as to receive rivets, and Figs. 12, 13 and 14 are fragmentary sectional views on the correspondingly numbered lines of Figs. 9, 10 and 11.

Referring to the drawing, 1 and 2 indicate a pair of embossing dies adapted to emboss foil on opposite sides of a sheet of plastic squeezed therebetween. The dies are provided with aligning means which may, for example, consist of pins 3 in the die 2 which fit in holes 4 in the die 1, so that the dies always register. On the working faces of the dies there are raised projections such as terminals 5 and leads 6. These projections are easily made by coating the working faces of the dies with a resist in the areas in which the projections are to be formed and then etching away the remainder of the surface of the die so that the projections extend of the order of 15 thousandths of an inch above the etched surface. The terminal portions 5 of the dies 1 and 2 register with each other so that in the completed circuit element, the terminals may be connected by rivets extending through the sheet. The terminals may be soldered to leads of electric circuit components or contact clips may be riveted to the terminals. The lead portions 6 make circuit interconnections between the various terminals and the elements connected thereto. The lead portions 6 do not register and the arrangement of the leads and terminal portions obviously is subject to wide variation depending upon the requirements of the electric circuit.

In use, the dies 1 and 2 are arranged in a press having heated platens 7 and 8 which are squeezed together first to emboss sheets 9 and 10 of foil into an intermediate plastic base sheet 11 and then to maintain the molding pressure necessary to set or cure the plastic base sheet. As shown in Fig. 4 there may be an intermediate sheet of adhesive 12 between each foil sheet and the plastic base sheet so as to secure better adherence of the foil to the base sheet. With some plastics, the adhesive may not be necessary. Also, the adhesive may be pre-coated on the foil.

The base sheet 11 is of deformable plastic in an uncured or partially cured state. The base sheet may for example consist of paper fiber impregnated with a thermosetting phenolic resin felted togther on a paper machine so as to produce a sheet which can be further deformed under pressure. Other fibers such as glass may be used. Other plastics may also be used. Melamine and diallylphthalate have been used. The diallylphthalate has sufficient adhesion to the foil so that no additional adhesive is required. The paper fiber phenolic sheet is presently the most economical. It is not necessary that the plastic be thermosetting as thermoplastic resins may also be used. It is also not necessary that the fibers be felted as woven fibers are usable. It is of course necessary that the base sheet have suitable electrical properties and this may dictate the composition if the elecrical requirements are severe.

The cement 12 must be of a type which cures or sets under the same conditions as the base sheet 11. For the paper fiber phenolic base sheet the adhesive may, for example, be Minnesota Mining Type 583. In general, such adhesives have the property of physically wetting or chemically combining with the plastic and metal. If the plastic resin in the base sheet 11 has the property of physically wetting metal such as diallylphthalate no adhesive may be necessary.

The foil 9 and 10 can conveniently be thin copper. Preferably the side of the foil adjacent the base sheet 11 has an etched or roughened surface such as obtained on one surface of electrolytic copper foil. The opposite surface of the foil is preferably pre-tinned or coated with soft solder such as 60 tin–40 lead. Having the pre-tinned or solder coated exterior surface eliminates the necessity for tinning at a later stage. The tin coating does not interfere with the embossing and the elimination of the later tinning step avoids the possibility of short circuits between adjacent terminals and leads which may be particularly troublesome in miniature circuits.

When the base sheet 11 sandwiched between the foil 9 and 10 is initially loaded between the dies 1 and 2 (Fig. 6) the base sheet is cold and the dies 1 and 2 are hot. The initial deformation of the foil as the dies are squeezed together under heavy pressure, as indicated in Fig. 7, is due to the physical characteristics of the uncured base sheet. The plastic resin in the base sheet has not been brought up to temperature and is not flowable. It accordingly is possible to use an initial pressure on the dies 1 and 2 which may be much greater than could be tolerated for curing the plastic. For example, with the base sheet of paper fiber phenolic resin which has a curing pressure of the order of 1,000 pounds per square inch it is possible to use an initial pressure of 10,000 pounds per square inch so as to obtain good definition of the embossing of the foil into the base sheet. If this initial pressure were continued until the base sheet 11 was brought up to curing temperature, the plastic in the base sheet would go through a thermoplastic flowable stage and would flow out the edges of the sheet. This would change the properties of the sheet. In the paper phenolics, the electrical properties require the presence of substantial amounts of the phenolic resin. Accordingly with paper phenolics, as the dies go from the embossing stage illustrated in Fig. 7 to the molding or curing stage indicated in Fig. 8 the pressure is reduced. There will be some further compression of the base sheet in the Fig. 8 position, but this is due to the flowability of the plastic as it becomes heated. The initial embossing pressure is desirable because it permits the use of materials which would not otherwise be usable. It is not always necessary that the initial embossing pressure be different from the molding pressure. In melamine glass fiber sheets where the electrical properties are derived primarily from the glass fiber and only a small amount of melamine coats the fibers the embossing pressure e. g. 10,000 pounds per square inch can be continued during molding. This is an example of a sheet where the embossing and molding pressures can be the same because the amount of plastic is so small that none will squeeze out of the sheet during molding and thereby change the electrical properties of the finished sheet. Although the dies 1 and 2 are closed under heavy pressure, there is no danger of plastic reaching the outer or exposed surface of the foil and thereby causing the dies to stick to the foil. The continuous coating of foil over the portion of the base sheet in contact with the dies has the practical advantage of making the curing operation possible without worrying of sticking of the dies to the foil.

At the end of the curing operation, the element has the appearance indicated in Figs. 9 and 12. Both exposed surfaces of the base sheet 11 are entirely covered by foil and there are embossed depressions 5a and 6a corresponding to the terminal and lead forming portions 5 and 6 of the dies 1 and 2. As is apparent from the section, Fig. 12, the embossed portions 5a or 6a are substantially below the under surface of the film, so that if the completed element is fed through a surface grinder or is held against a sanding belt or disk the entire unembossed portion of the film can be ground or abraded away to a depth below the unembossed portion leaving a smooth sanded or ground surface with the embossed portion substantially flush with the ground surface as shown in Figs. 10 and 13. The surface grinder which uses a wheel and the sanding belt or disk are representative of surface abrasion apparatus for abrading or cutting away the surface to a depth below the unembossed portions. After punching the holes 14 in the terminal portions 5a the element then has the appearance shown in Figs. 11 and 14, and is ready for connection to the desired circuit elements and tubes.

By the method so far followed there is produced a base of insulating material having embedded therein conductor and terminal elements which facilitate the manufacture of the complete circuit. The embossing dies shown in Figs. 1 and 2 are very economically produced by standard photo engraving methods. By having the foil pretinned on its outer or exposed surface the need for a subsequent tinning operation which might make short circuits between closely spaced conductors is eliminated. Because the foil completely covers the plastic base sheet there is no danger of the foil sticking to the dies. By having the embossing step carried out by the same dies which subsequently cure the plastic it is possible to use the proper pressures for embossing and curing without interfering with each other and there is further eliminated need for handling embossed metal which would be very difficult in the case of thin foil usually used in electronic circuits. The surface grinding which eliminates the unembossed portions of the foil so that only the embossed or wanted portions remain can be very cheaply and accurately carried out by means of abrasive wheel grinding, or belt or disk sanding.

What I claim as new is:

1. The method of making printed electric circuits which comprises arranging a metal foil on an uncured deformable base of fibers of insulating material and an impregnating plastic and including adhesive material under the foil and with a die on the foil having embossing projections thereon corresponding to the circuit to be printed, pressing the die, foil and base together in a press having platens heated to approximately the flowing temperature of the impregnating plastic, the initial pressure being sufficient to emboss the foil under the projections into the underlying surface of the base prior to the heating of the base to the temperature of the thermoplastic or flowable stage of the plastic, continuing the platen pressure at the curing or setting pressure for the base and maintaining the same until the foil is united and consolidated with the base, and surface abrading away the foil coated surface of the base to a depth below that of the unembossed portions of the foil to leave only the embossed portions of the foil united with the base.

2. The method of making printed electric circuits which comprises arranging a copper foil on an uncured deformable base of fibers of insulating material and an impregnating plastic and including adhesive material under the foil, the foil being tinned on the exposed surface and with a die on the exposed surface of the foil having embossing projections thereon corresponding to the circuit to be printed, pressing the die, foil and base together in a press having platens heated substantially to the flowing temperature of the impregnating plastic, the initial pressure being sufficient to emboss the foil under the projections into the underlying surface of the base prior to the heating of the base to the temperature of the thermoplastic or flowable stage of the plastic, continuing the platen pressure at the curing or setting pressure for the base and maintaining the same until the foil is united and consolidated with the base and the base is cured to a rigid dense state, and cutting away the foil coated surface of the base to a depth below that of the unembossed portions of the foil to leave only the embossed portions of the foil united with the base.

3. The method of making printed electric circuits which comprises arranging a metal foil on an uncured deformable base of paper fibers coated with a thermosetting plastic and including additional adhesive material under the foil and with a die on the foil having embossing projections thereon corresponding to the circuit to be printed, pressing the die, foil and base together in a press having platens heated to the flowing temperature of the impregnating plastic, the initial pressure being sufficient to emboss the foil under the projections into the underlying surface of the base prior to the heating of the base to the temperature of the thermoplastic or flowable stage of the plastic, reducing the platen pressure to the curing or setting pressure for the base and maintaining the same until the foil is united and consolidated with the base, and cutting away the foil coated surface of the base to a depth below that of the unembossed portions of the foil to leave only the embossed portions of the foil united with the base.

4. The method of making printed electric circuits which comprises arranging a metal foil on an uncured deformable base of fibers of insulating material and an impregnating plastic selected from the class having the property of adhering to metal under curing conditions and with a die on the foil having embossing projections thereon corresponding to the circuit to be printed, pressing the die, foil and base together in a press having platens heated substantially to the flowing temperature of the impregnating plastic, the initial pressure being sufficient to emboss the foil under the projections into the underlying surface of the base prior to the heating of the base to the temperature of the thermoplastic or flowable stage of the plastic, continuing the platen pressure at the curing or setting pressure for the base and maintaining the same until the foil is united and consolidated with the base, and cutting away the foil coated surface of the base to a depth below that of the unembossed portions of the foil to leave only the embossed portions of the foil united with the base.

5. The method of making printed electric circuits which comprises arranging a metal foil on an uncured deformable base of fibers of insulating material and an impregnating plastic and including adhesive material under the foil and with a die on the foil having embossing projections thereon corresponding to the circuit to be printed, pressing the die, foil and base together in a press having platens heated to the flowing temperature of the impregnating plastic under pressure sufficient to emboss the foil under the projections into the underlying surface of the base and maintaining the pressure until the plastic is cured and the foil is united and consolidated with the base, and cutting away the foil coated surface of the base to a depth below that of the unembossed portions of the foil to leave only the embossed portions of the foil united with the base.

References Cited in the file of this patent

UNITED STATES PATENTS

| Number | Name | Date |
|---|---|---|
| 1,767,715 | Stoekle | June 24, 1930 |
| 2,288,735 | O'Connell | June 7, 1942 |
| 2,427,144 | Jansen | Sept. 9, 1947 |
| 2,441,960 | Eisler | May 25, 1948 |
| 2,447,541 | Sabee et al. | Aug. 24, 1948 |
| 2,602,036 | Sullivan | July 1, 1952 |
| 2,647,852 | Franklin | Aug. 4, 1953 |

FOREIGN PATENTS

| 602,492 | Great Britain | May 27, 1948 |